(12) United States Patent
Hardin (10) Patent No.: US 11,196,191 B1
(45) Date of Patent: Dec. 7, 2021

(54) ELECTRICAL CONNECTOR WITH CURE-IN-PLACE RESIN

(71) Applicant: Taylor Hardin, Apollo Beach, FL (US)

(72) Inventor: Taylor Hardin, Apollo Beach, FL (US)

( * ) Notice: Subject to any disclaimer, the term of this patent is extended or adjusted under 35 U.S.C. 154(b) by 0 days.

(21) Appl. No.: 17/333,730

(22) Filed: May 28, 2021

Related U.S. Application Data (60) Provisional application No. 63/104,596, filed on Oct. 23, 2020.

(51) Int. Cl.
*H01R 4/70* (2006.01)
*H01R 4/12* (2006.01)
*H02G 15/00* (2006.01)

(52) U.S. Cl.
CPC ............... *H01R 4/70* (2013.01); *H01R 4/12* (2013.01); *H02G 15/003* (2013.01)

(58) Field of Classification Search
CPC ........... H01R 4/70; H01R 4/12; H02G 15/003
USPC .......................................................... 174/76
See application file for complete search history.

(56) References Cited

U.S. PATENT DOCUMENTS

| | | | | |
|---|---|---|---|---|
| 2,621,228 A | * | 12/1952 | Tompers | H02G 15/013 174/93 |
| 3,326,442 A | * | 6/1967 | Fattor | H01R 4/723 228/56.3 |
| 3,558,800 A | * | 1/1971 | Wallis | H01R 4/22 174/87 |
| 5,023,402 A | | 6/1991 | King, Jr. et al. | |
| 5,397,858 A | * | 3/1995 | Delalle | H01R 4/22 174/87 |
| 5,431,758 A | | 7/1995 | Delalle | |
| 5,514,836 A | * | 5/1996 | Delalle | H01R 4/22 174/74 R |
| 6,958,449 B1 | | 10/2005 | Ziebart et al. | |
| 7,368,663 B1 | | 5/2008 | Fisher et al. | |
| 9,627,795 B2 | * | 4/2017 | Smith | H01R 13/5216 |
| 2012/0034796 A1 | * | 2/2012 | Joye | H01R 4/00 439/147 |

* cited by examiner

*Primary Examiner* — Timothy J Thompson
*Assistant Examiner* — Michael F McAllister
(74) *Attorney, Agent, or Firm* — Larson & Larson, P.A.; Justin P. Miller; Frank Liebenow (57) ABSTRACT

The electrical connector with cure-in-place resin is a twist-on wire connector with integrated resin injection, the resin curing around the enclosed conductors. The resulting connection is permanent, maintaining connectivity and excluding water. At the tip of the body, a sliding cartridge holds a single or multi-part resin within one or more sealed chambers. After the conductors are introduced into the body, and the connector tightened into place, the sliding cartridge is pressed into the body. The sliding causes the cartridge to compress against a piercing tip, causing resin to pass into the body of the connector, curing around the conductors.

13 Claims, 7 Drawing Sheets

ELECTRICAL CONNECTOR WITH CURE-IN-PLACE RESIN

RELATED APPLICATIONS

This application claims priority to U.S. Pat. App. No. 63/104,596, filed Oct. 23, 2020, titled Electrical connector with cure-in-place resin.

FIELD

This invention relates to the field of wire connectors and more particularly to a device for permanent, waterproof connection of two or more conductors.

BACKGROUND

Conductors, such as copper wiring, are commonly connected to each other to form circuits. Connections are used to create branches, connect a power supply to a fixture, and to extend wiring. Regardless of the purpose, strong and reliable electrical connections are critical.

Twist-on connectors allow an installer to quickly and easily connect wires, improving the connection beyond merely twisting two conductors together.

But in an outdoor environment, twist-on connectors fail to exclude water, and can loosen. The result is a degradation in the connection, and perhaps a disconnection of the wires.

What is needed is a twist-on connector that is easy to apply and can quickly seal the conductors against water intrusion and later loosening.

SUMMARY

The electrical connector with cure-in-place resin is a twist-on wire connector with integrated resin injection, the resin curing around the enclosed conductors. The resulting connection is permanent, maintaining connectivity and excluding water.

The body of the twist-on connector includes threads, or other means of engaging and tightening onto the two or more conductors.

At the upper end of the, a sliding cartridge protrudes, held in place by a pull tab. Just below, or held within, the sliding cartridge is a resin cartridge that holds a single or multi-part resin within one or more sealed chambers.

After the conductors are introduced into the body, and the connector tightened into place, the pull tab is removed. The sliding cartridge is then pressed into the body.

The sliding causes the resin cartridge to compress against the piercing tip of the puncturing device, forcing resin the body of the connector, the resin flowing around the conductors.

The resin cures or dries in place, surrounding the conductors. The result is a tough and permanent connection.

The resin can be a single part resin that cures when activated by water vapor or air, or a multi-part resin that cures after mixing, such as a two-part epoxy that includes a resin and a hardener.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Reference will now be made in detail to the presently preferred embodiments of the invention, examples of which are illustrated in the accompanying drawings. Throughout the following detailed description, the same reference numerals refer to the same elements in all figures.

Figure 1:
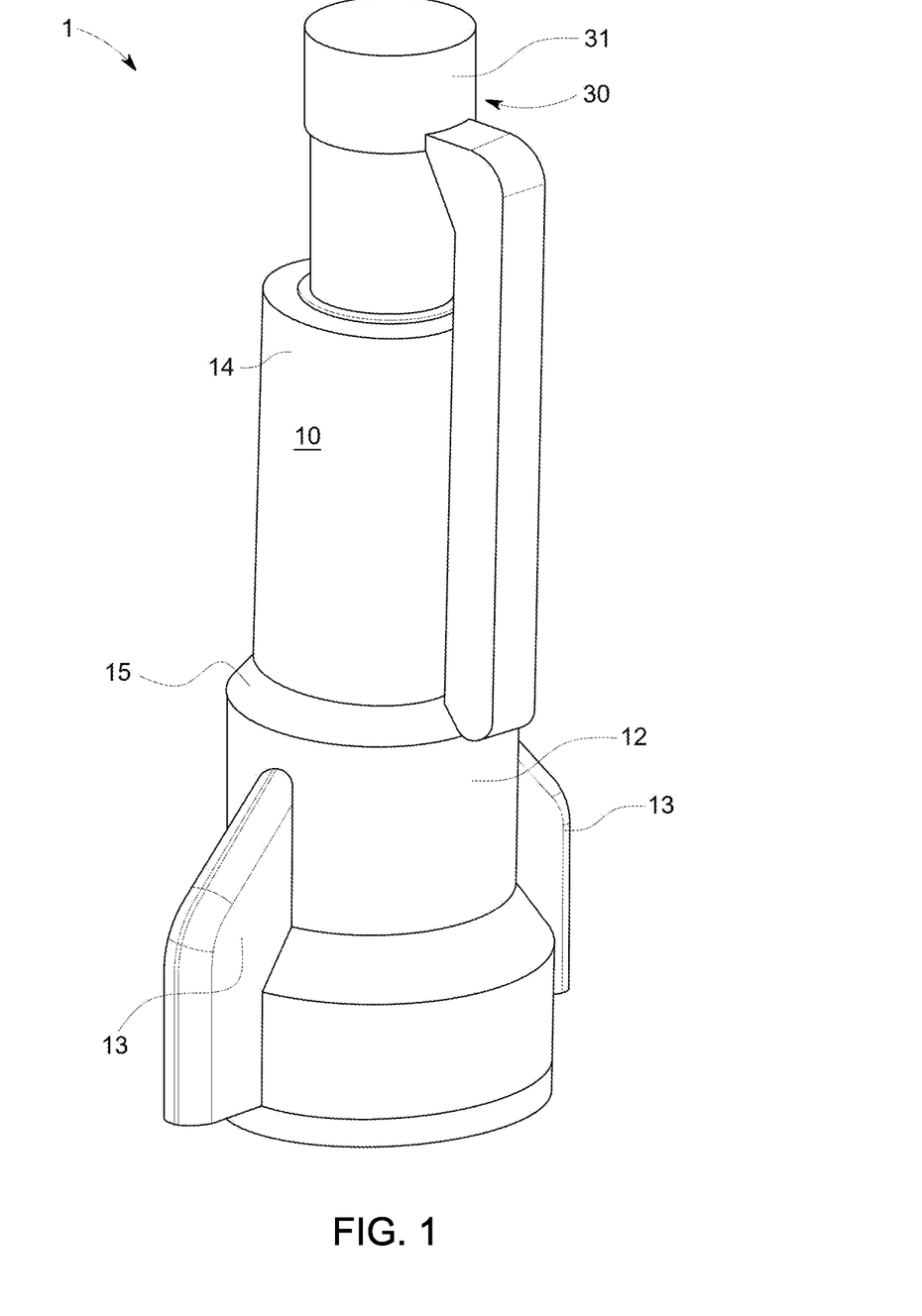
FIG. 1 illustrates a first view of the electrical connector with cure-in-place resin.

Referring to FIG. 1, a first view of the electrical connector with cure-in-place resin is shown.

The electrical connector with cure-in-place resin 1 is shown with body 10, base 12, optional wings 13, and tip 14.

The sliding cartridge 30 is shown with head 31 fully extended upward, ready for the electrical connector with cure-in-place resin 1 to be installed.

Figure 2:
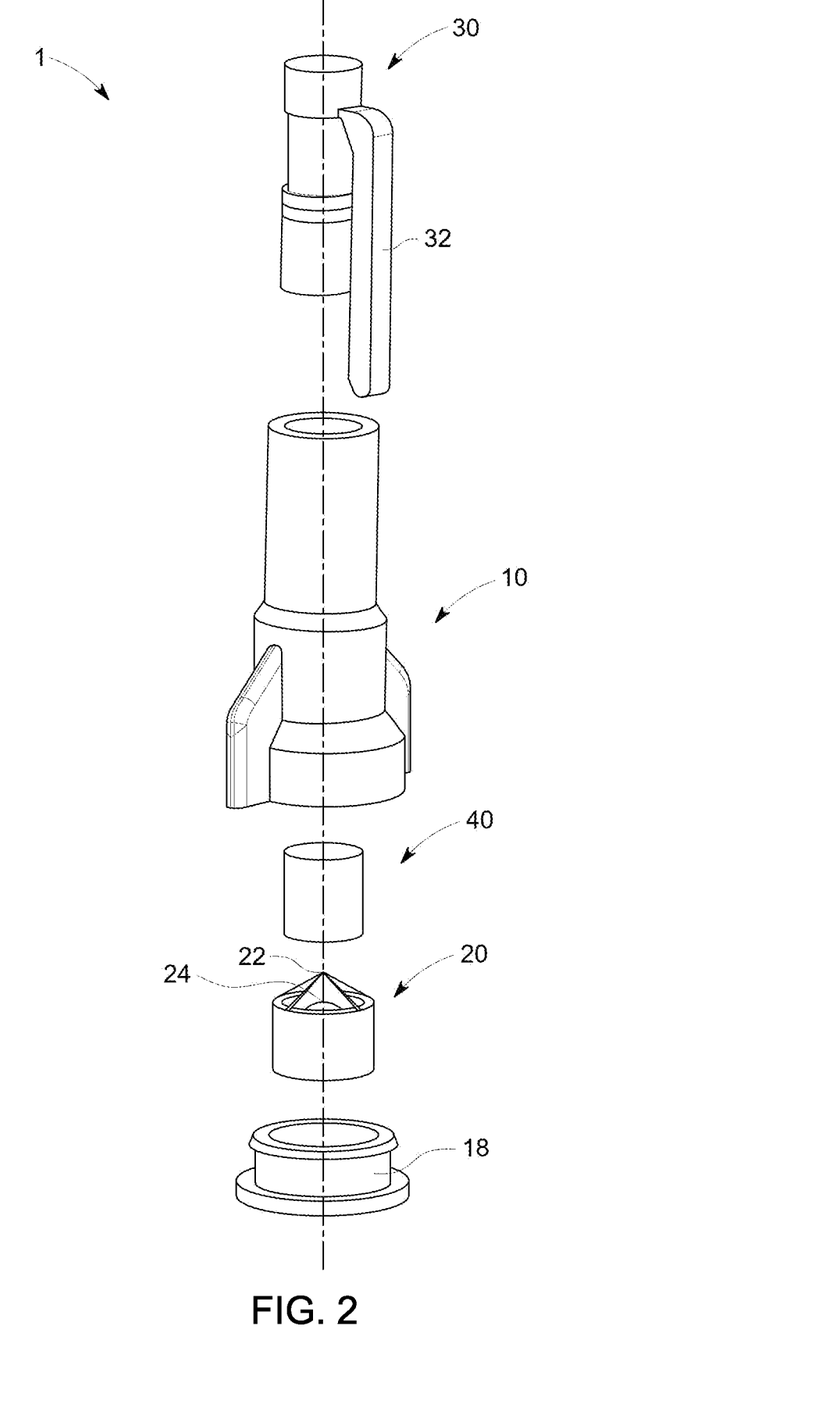
FIG. 2 illustrates an exploded view of the electrical connector with cure-in-place resin.
Figure 3:
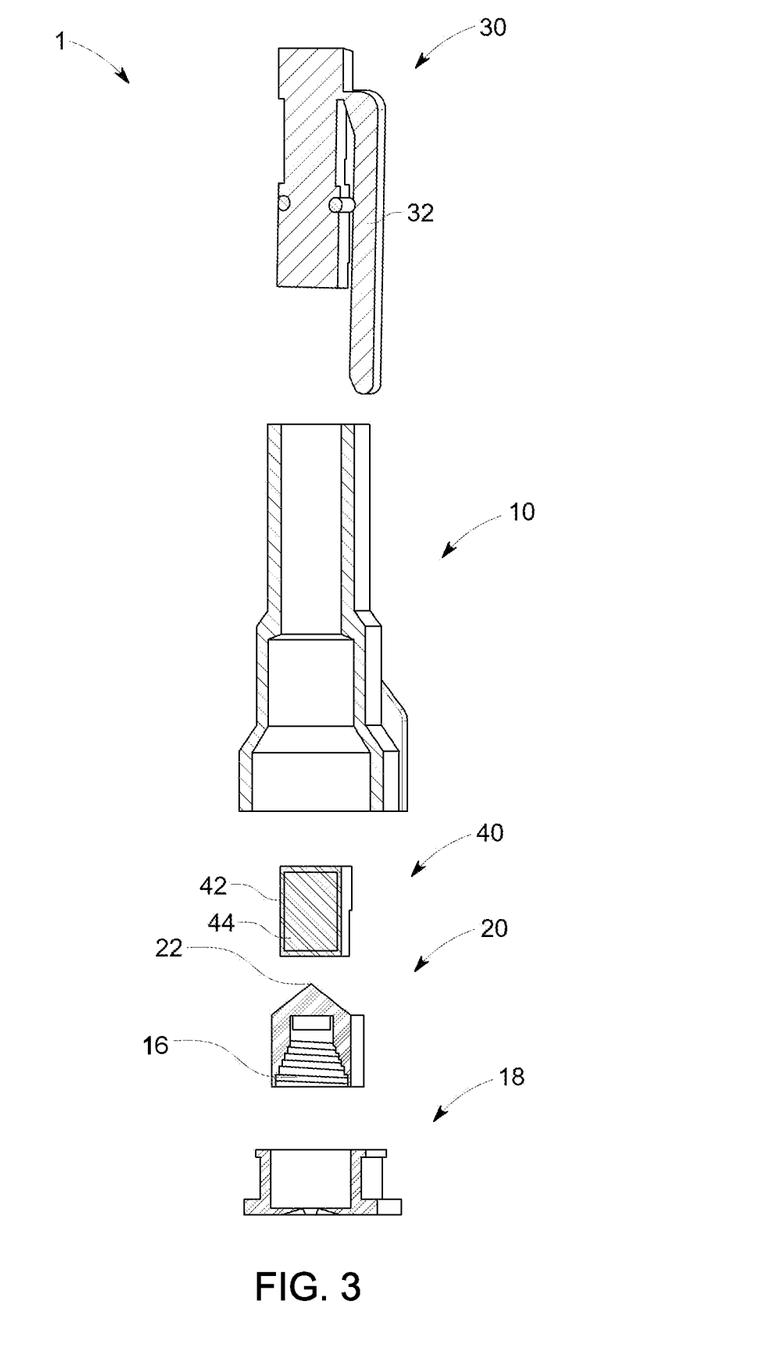
FIG. 3 illustrates an exploded cross-sectional view of the electrical connector with cure-in-place resin.

Referring to FIGS. 2 and 3, an exploded view of the electrical connector with cure-in-place resin is shown.

The primary components of the electrical connector with cure-in-place resin 1 include a sliding cartridge 30 with pull tab 32, body 10, resin cartridge 40, puncturing device 20, and shield 18.

The puncturing device 20 includes a piercing tip 22 and one or more passageways 24 to allow resin to pass through.

The resin cartridge 40 is formed from a resin housing 42 that holds resin 44.

Figure 4:
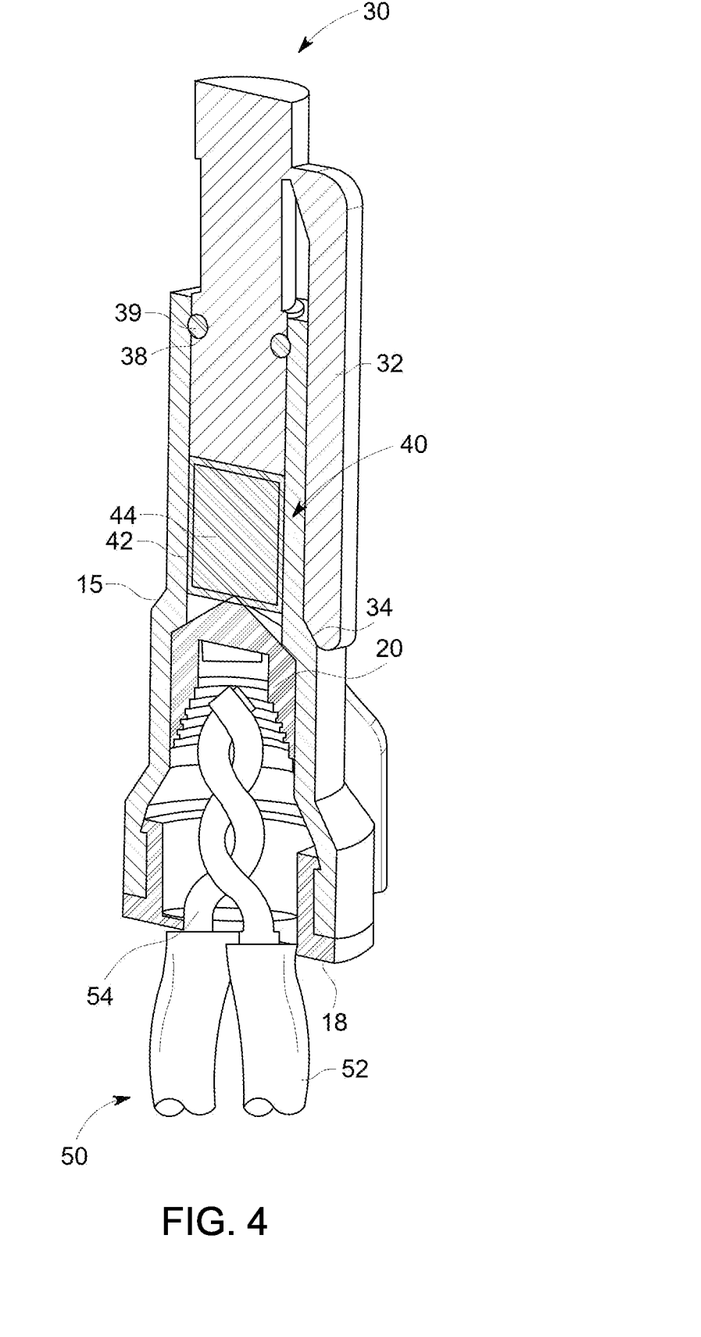
FIG. 4 illustrates an assembled cross-sectional view of the electrical connector with cure-in-place resin.

Also shown are threads 16 that allow the electrical connector with cure-in-place resin 1 to grip the conductors 54 (see FIG. 4).

Referring to FIG. 4, an assembled cross-sectional view of the electrical connector with cure-in-place resin is shown.

The electrical connector with cure-in-place resin 1 is shown with wire 50 installed, the wire 50 formed from insulation 52 and one or more conductors 54.

The sliding cartridge 30 is shown with detent 38 that holds a sealing ring 39. The sealing ring 39 prevents resin 44 from flowing upward, between the body 10 and sliding cartridge 30.

The pull tab stop surface 34 rests against the body stop surface 15, preventing the sliding cartridge 30 from sliding into the body 10 until the user is ready.

Figure 5:
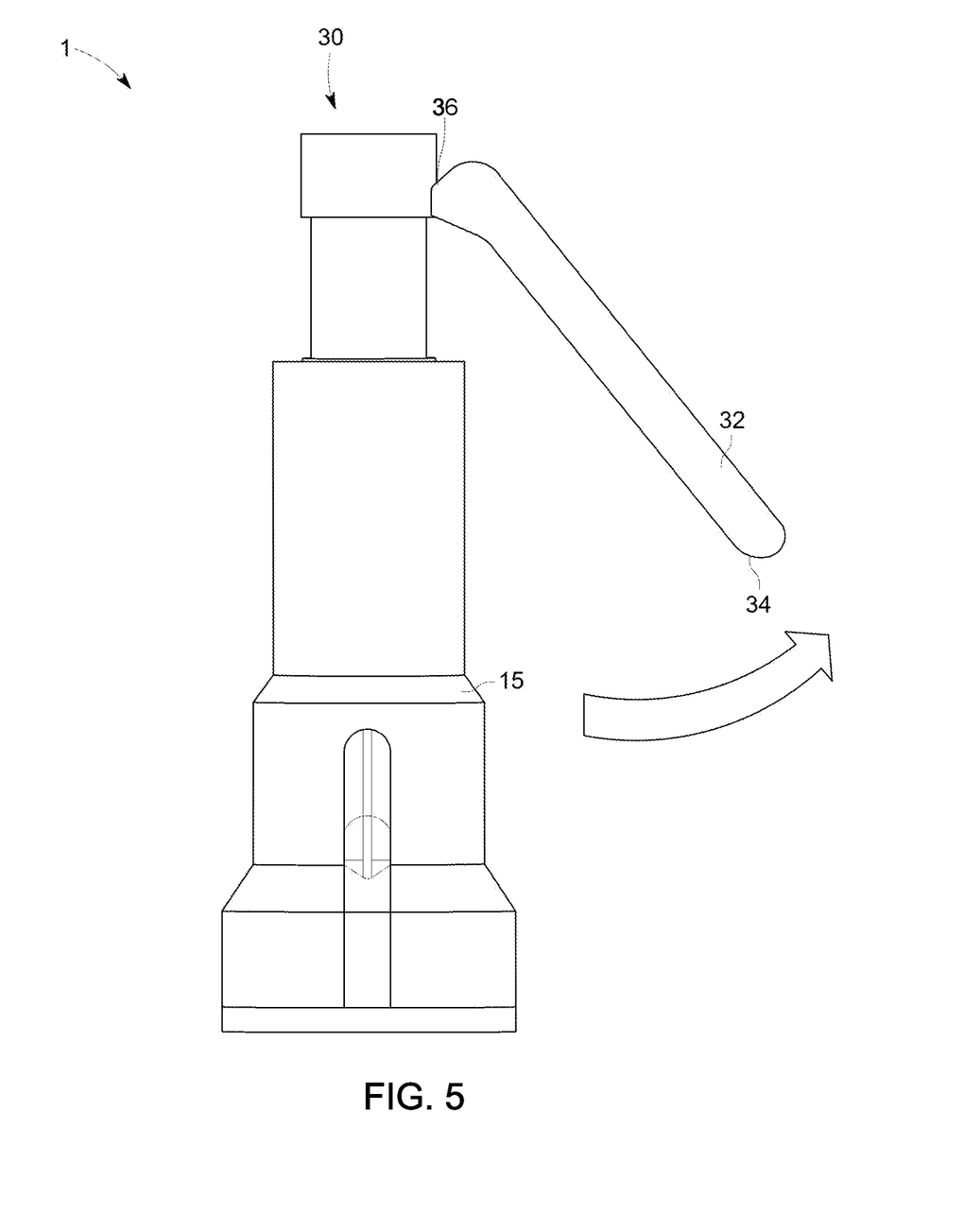
FIG. 5 illustrates a second view, showing removal of the pull tab, of the electrical connector with cure-in-place resin.

Referring to FIG. 5, a second view, showing removal of the pull tab, of the electrical connector with cure-in-place resin is shown.

The pull tab 32 is removed by an upward, rotating motion. This motion separates the pull tab stop surface 34 from the body stop surface 15, thus freeing the sliding cartridge 30 to move into the body 10.

The pull tab 32 is optionally removable, able to separate at the pull tab break point 36.

Figure 6:
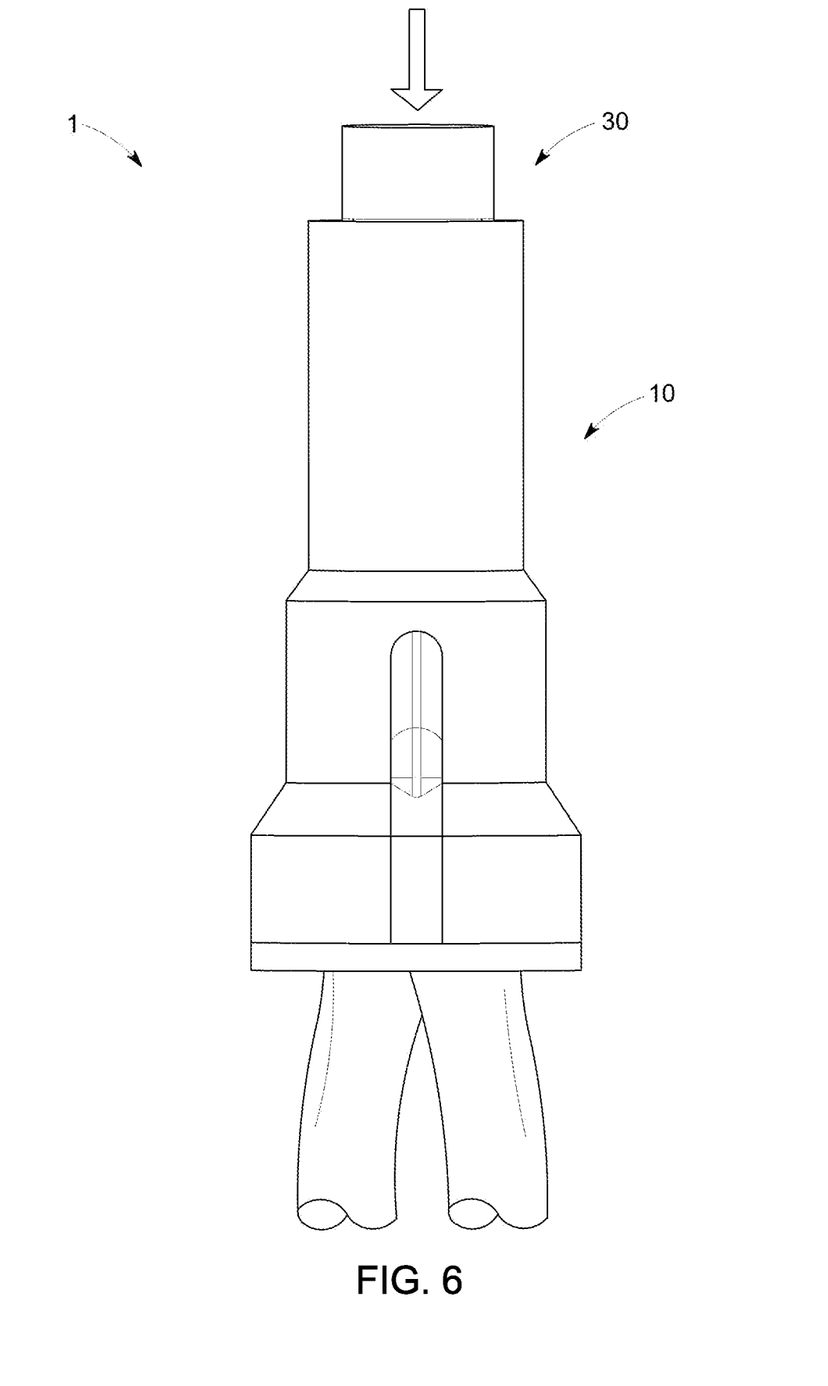
FIG. 6 illustrates a third view, showing compression of the sliding cartridge, of the electrical connector with cure-in-place resin.

Referring to FIG. 6, a third view, showing compression of the sliding cartridge, of the electrical connector with cure-in-place resin is shown.

Figure 7:
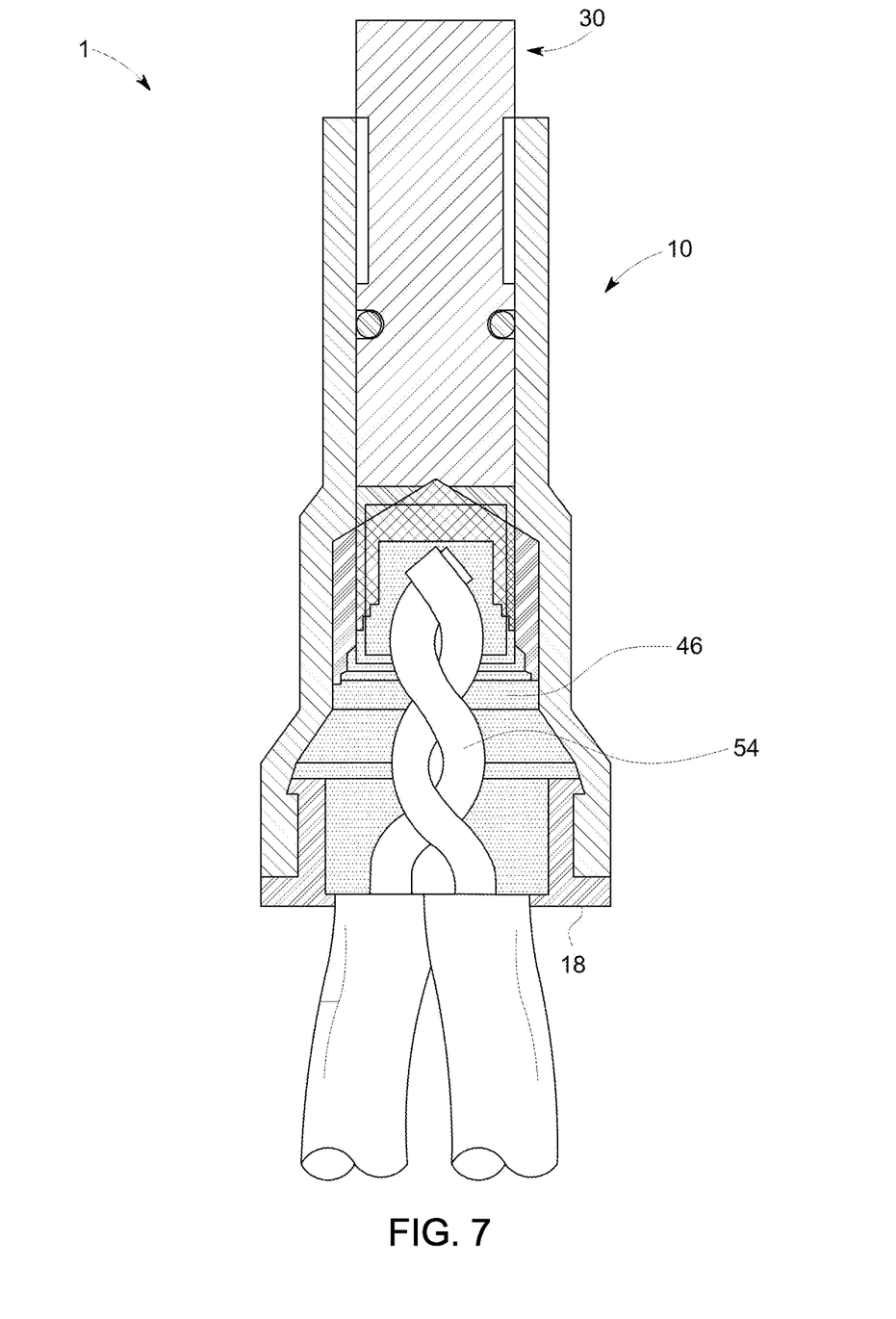
FIG. 7 illustrates a cross-sectional view, showing the resin around the wires, of the electrical connector with cure-in-place resin.

The sliding cartridge 30 is pressed into the body 10, forcing resin 44 (see FIG. 4) to surround the wire 50 (see FIG. 7).

Referring to FIG. 7, a cross-sectional view, showing the resin around the wires, of the electrical connector with cure-in-place resin is shown.

The sliding cartridge 30 has forced the resin 44 (see FIG. 4) to surround the wire 50, resulting in cured resin 46.

The wire 50 is now integral to the electrical connector with cure-in-place resin 1. The cured resin 46 is protecting the wire 50 from water and from loosening.

The shield 18 substantially confines the resin to the space around the wire 50, minimizing leaks.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction, and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A twist-on electrical connector with permanent sealing, the connector comprising:
   a body;
      the body including a wire chamber;
   a reservoir of a resin;
   a sliding cartridge causing movement of the reservoir of resin;
      the sliding cartridge moving within the body;
   whereby after the twist-on electrical connector is affixed to one or more conductors, the sliding cartridge is pressed into the body, forcing the resin into the wire chamber.

2. The twist-on electrical connector of claim 1, further comprising a pull tab;
   the pull tab holding the sliding cartridge in position with respect to the body, thereby preventing unintentional release of the resin;
   whereby the pull tab is removable to allow the sliding cartridge to be pressed into the body.

3. The twist-on electrical connector of claim 1, further comprising:
   a piercing tip;
      the piercing tip puncturing the reservoir of the resin when the sliding cartridge is pressed into the body, thus allowing a release of the resin.

4. The twist-on electrical connector of claim 3, further comprising:
   one or more passageways;
      the one or more passageways allowing the resin to pass around the piercing tip.

5. The twist-on electrical connector of claim 1, wherein the resin is two resins, the two resins activating upon being mixed during introduction into the body.

6. An electrical connector for wires, the electrical connector comprising:
   a body;
   a wire chamber within the body;
   a sliding cartridge;
      the sliding cartridge partially surrounded by the body;
   a resin cartridge;
      the resin cartridge filled with a resin, the resin hardening after being expelled from the resin cartridge;
   a shield;
      the shield preventing resin from escaping through the wire chamber and out of the body;
   whereby depressing the sliding cartridge forces the resin into the wire chamber, the resin then curing to secure any wires within the wire chamber.

7. The electrical connector for wires of claim 6, the electrical connector further comprising:
   a pull tab;
      the pull tab initially resting against the body to prevent motion of the sliding cartridge with respect to the body;
      the pull tab removable by a user, whereby the sliding cartridge can then be pressed into the body.

8. The electrical connector for wires of claim 6, the electrical connector further comprising:
   a puncturing device;
      the puncturing device within the body, between the sliding cartridge and the wire chamber;
      the puncturing device causing the resin cartridge to rupture, thus allowing the resin to escape.

9. A device to bond two or more wires while excluding water, the device comprising:
   a body into which the two or more wires are inserted;
      the two or more wires inserted into a wire chamber at a bottom end of the body;
   a slidable cartridge;
      the slidable cartridge protruding from a top of the body;
   a resin cartridge holding a resin;
      the resin cartridge within the body, initially placed between the slidable cartridge and the two or more wires;
   wherein the slidable cartridge is forced toward the two or more wires, the resin surrounding the two or more wires, the resin then curing to create a cured resin;
   whereby the cured resin holds the two or more wires, while excluding water.

10. The device to bond two or more wires while excluding water of claim 9, the device further comprising:
    a pull tab;
       the pull tab initially resting against the body to prevent motion of the slidable cartridge with respect to the body;
       the pull tab removable by a user, whereby the slidable cartridge can then be pressed into the body.

11. The device to bond two or more wires while excluding water of claim 9, device further comprising:
    a puncturing device;
       the puncturing device within the body, between the slidable cartridge and the wire chamber;
       the puncturing device causing the resin cartridge to rupture, thus allowing the resin to escape.

12. The device to bond two or more wires while excluding water of claim 11, the device further comprising:
    one or more passageways;
       the one or more passageways allowing the resin to pass around the puncturing device.

13. The device to bond two or more wires while excluding water of claim 9, the device further comprising:
    a shield;

the shield preventing resin from escaping through the wire chamber and out of the body.

\* \* \* \* \*